(12) United States Patent
Descamps et al.

(10) Patent No.: US 10,371,002 B2
(45) Date of Patent: Aug. 6, 2019

(54) CONTROL SYSTEM FOR A GAS TURBINE ENGINE

(71) Applicant: General Electric Company, Schenectady, NY (US)

(72) Inventors: Nicholas Adam Descamps, Cincinnati, OH (US); David Alexander Hiett, Cincinnati, OH (US); John Thomas Lammers, West Chester, OH (US); Robert Charles Hon, Fort Mitchell, KY (US); Thomas Charles Swager, Maineville, OH (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 15/181,461

(22) Filed: Jun. 14, 2016

(65) Prior Publication Data
US 2017/0356302 A1 Dec. 14, 2017

(51) Int. Cl.
*F01D 19/00* (2006.01)
*F02C 9/00* (2006.01)
(Continued)

(52) U.S. Cl.
CPC .............. *F01D 19/00* (2013.01); *F01D 21/06* (2013.01); *F02C 7/262* (2013.01); *F02C 9/00* (2013.01);
(Continued)

(58) Field of Classification Search
CPC ........ F01D 19/00; F02C 9/00; F05D 2220/32; F05D 2260/80; F05D 2260/85
See application file for complete search history.

(56) References Cited

U.S. PATENT DOCUMENTS 5,269,136 A * 12/1993 Khalid .................... F04D 27/02
60/204
5,622,045 A 4/1997 Weimer et al.
(Continued)

FOREIGN PATENT DOCUMENTS

| EP | 0 736 142 A1 | 10/1996 |
| EP | 0 815 354 A1 | 1/1998 |
| EP | 1 258 617 A2 | 11/2002 |

OTHER PUBLICATIONS

"Airplane Turbofan Engine Operation and Malfunctions Basic Familiarization for Flight Crews," Chapter 1, General Principles, Retrieved from the internet URL http://practicalaero.com/wp-content/uploads/2010/12/FAA-Engine-Document.pdf, pp. 1-38 (Feb. 13, 2018).
(Continued)

*Primary Examiner* — Jerrah Edwards
*Assistant Examiner* — Mathew Franklin Gordon
(74) *Attorney, Agent, or Firm* — Dority & Manning, P.A.

(57) ABSTRACT

Systems and methods for shutting down a gas turbine engine in response to a severe mechanical failure include determining a rate of change of one or more process conditions. If the rate of change of the one or more process conditions exceeds a respective predetermined failure threshold, a potential severe mechanical failure of the gas turbine engine may be determined. Steps may be taken to confirm the potential severe mechanical failure of the gas turbine engine. In response, an engine restart is prevented.

17 Claims, 6 Drawing Sheets

(51) Int. Cl.
   *F01D 21/06* (2006.01)
   *F02C 7/262* (2006.01)
   *F02C 9/46* (2006.01)

(52) U.S. Cl.
   CPC ............ *F02C 9/46* (2013.01); *F05D 2220/32* (2013.01); *F05D 2260/80* (2013.01); *F05D 2260/85* (2013.01); *F05D 2270/092* (2013.01); *F05D 2270/304* (2013.01); *F05D 2270/334* (2013.01); *Y02T 50/671* (2013.01)

(56) References Cited

U.S. PATENT DOCUMENTS

| | | |
|---|---|---|
| 6,176,074 B1 | 1/2001 | Thompson et al. |
| 6,293,085 B2 | 9/2001 | Thompson et al. |
| 7,222,002 B2 | 5/2007 | Maine |
| 8,111,161 B2 | 2/2012 | Lee |
| 8,172,509 B2 | 5/2012 | Bart et al. |
| 8,818,684 B2 | 8/2014 | John et al. |
| 8,943,876 B2 * | 2/2015 | Rowe .................... F01D 21/003 73/112.01 |
| 9,045,999 B2 | 6/2015 | Badami |
| 2001/0000090 A1 | 4/2001 | Thompson et al. |
| 2012/0317955 A1 | 12/2012 | Rowe et al. |
| 2014/0121934 A1 * | 5/2014 | Dooley .................. F01D 21/06 701/100 |
| 2014/0145863 A1 * | 5/2014 | Cottet .................... B64D 45/00 340/971 |
| 2016/0363001 A1 * | 12/2016 | Argote .................... F01D 21/04 |
| 2017/0022907 A1 * | 1/2017 | Argote .................... F02C 7/262 |

OTHER PUBLICATIONS

International Search Report and Written Opinion issued in connection with corresponding PCT Application No. PCT/US2017/031014, dated Dec. 1, 2017.

\* cited by examiner

CONTROL SYSTEM FOR A GAS TURBINE ENGINE

FIELD OF THE INVENTION

The present subject matter relates generally to a control system for a gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The fan includes a plurality of fan blades rotatable by the core. During extreme events, sometimes referred to as a "fan blade out event", a fan blade of the plurality fan blades may detach during operation causing a severe mechanical failure of the gas turbine engine. Subsequent to such an event, the gas turbine engine is inoperable. However, upon detection of a flame within the combustion section having extinguished, current control systems for gas turbine engines typically attempt to relight or reignite. Such may create a hazard.

Hardware fixes to the above issue can be complicated and prohibitively expensive. Accordingly, a system or method for preventing the control system of a gas turbine engine from attempting to relight or reignite following a severe mechanical failure of the gas turbine engine would be useful. More specifically, such a system or method addressing the above issue without adding significantly to a cost or weight of the gas turbine engine would be particularly beneficial.

BRIEF DESCRIPTION OF THE INVENTION

Aspects and advantages of embodiments of the present disclosure will be set forth in part in the following description, or may be learned from the description, or may be learned through practice of the embodiments.

In one exemplary aspect of the present disclosure, a method for preventing a gas turbine engine restart in response to a severe mechanical failure is provided. The method includes determining if a first process condition, or a rate of change of a first process condition, exceeds a first failure threshold, the first failure threshold indicative of a severe mechanical failure of the gas turbine engine. The method also includes determining a potential severe mechanical failure of the gas turbine engine based at least in part on the determined process condition, or determined rate of change of the first process condition, exceeding the first failure threshold. The method also includes confirming the potential severe mechanical failure of the gas turbine engine by determining an accommodation time period following the determined potential severe mechanical failure has not elapsed. The method also includes preventing an engine restart.

In another exemplary aspect of the present disclosure, a method for preventing a gas turbine engine restart in response to a severe mechanical failure is provided. The method includes determining a rate of change of a first process condition, a rate of change of a second process condition, and a third process condition. The method also includes determining a potential severe mechanical failure of the gas turbine engine based on at least two of the following: the rate of change of the first process condition exceeding a first failure threshold; the rate of change of the second process condition exceeding a second failure threshold; or the third process condition, or the rate of change of the third process condition, exceeding a third failure threshold. The method also includes preventing an engine restart.

In an exemplary embodiment of the present disclosure, a control system for preventing a gas turbine engine restart in response to a severe mechanical failure is provided. The system includes one or more processors and one or more memory devices included with the gas turbine engine, the one or more memory devices storing instructions that when executed by the one or more processors cause the one or more processors to perform operations. The operations include determining a rate of change of a first process condition exceeds a first failure threshold, the first failure threshold indicative of a severe mechanical failure of the gas turbine engine. The operations also include determining a potential severe mechanical failure of the gas turbine engine based at least in part on the determined rate of change of the first process condition exceeding the first failure threshold. The operations also include confirming the potential severe mechanical failure of the gas turbine engine by determining an accommodation time period following the determined potential severe mechanical failure has not elapsed. The operations also include preventing an engine restart.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The present application is directed generally to systems and methods for shutting down a gas turbine engine in response to a severe mechanical failure of the gas turbine engine. For example, particular aspects of the present disclosure are directed to systems and methods for shutting down the gas turbine engine in response to a fan blade out event. Prior gas turbine engines may attempt to relight or ignite during or subsequent to a fan blade out event, which may result in a fire hazard.

The present application reviews certain process conditions, and more particularly, rates of change of certain process conditions, to determine a potential severe mechanical failure of the gas turbine engine. In response to determining a potential severe mechanical failure of the gas turbine engine, the present application initiates one or more steps for confirming the severe mechanical failure of the gas turbine engine. Once the severe mechanical failure of the gas turbine engine is confirmed, systems and methods in accordance with the present disclosure prevent an engine restart to prevent the engine from attempting to relight or reignite. A control system for a gas turbine engine incorporating such an exemplary method or system has the technical effect of providing for a more safe gas turbine engine with a reduced risk of fire hazard following a fan blade out event, or other severe mechanical failure, without increasing a cost or weight of the gas turbine engine.

Figure 1:
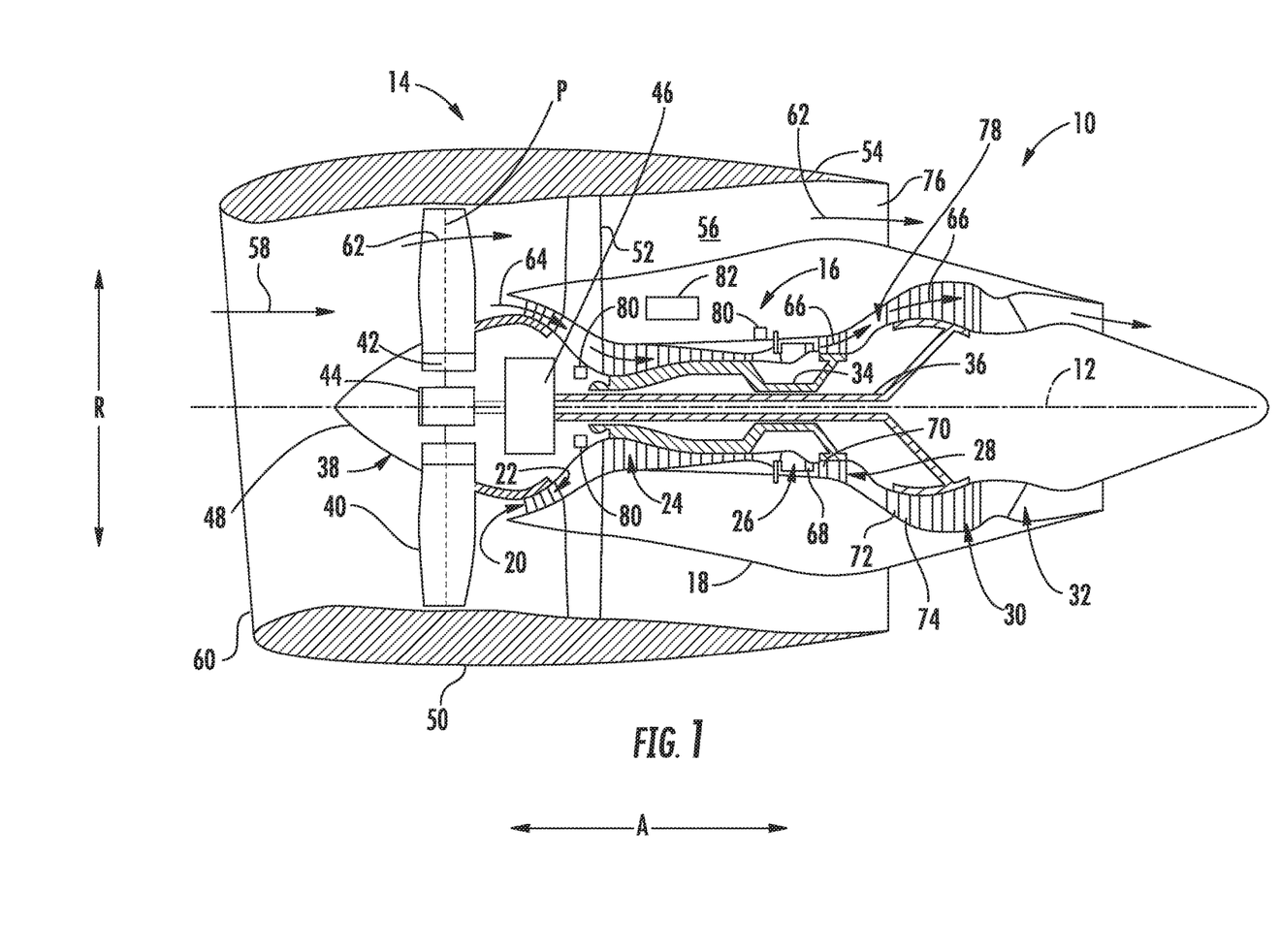
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal axis 12 provided for reference), a radial direction R, and a circumferential direction C (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. For the embodiment depicted, the nacelle 50 is supported relative to the core turbine engine 16 by a plurality of circumferentially-spaced outlet guide vanes 52, and a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Moreover, a number of sensors 80 can also be included in the turbofan engine 10 and such sensors 80 can output any number of usable signals regarding the operation of the turbofan engine 10 and its various systems and components. For example, the sensors 80 can include a variety of sensors 80 for determining a rotational speed N1 of the low pressure shaft or spool 36, a rotational speed N2 of the high pressure shaft or spool 34, a compressor pressure such as a compressor discharge pressure P3 (i.e., a pressure of the compressed air provided at an outlet of the HP compressor 24 to the combustion section 26), etc.

Additionally, the turbofan engine 10 depicted includes a controller 82 for controlling certain aspects of the turbofan engine 10. In some embodiments, the controller 82 can include one or more computing device(s), such as the one or more of a computing device 100 described below with reference to FIG. 2. The controller 82 can utilize inputs from the sensors 80 to monitor the turbofan engine 10, and further may receive inputs from one or more operators of an aircraft with which the turbofan engine 10 is installed. The controller 82 can be connected with other controllers of the turbofan engine 10, of other gas turbine engines, and/or of an aircraft with which the turbofan engine 10 is installed.

Figure 2:
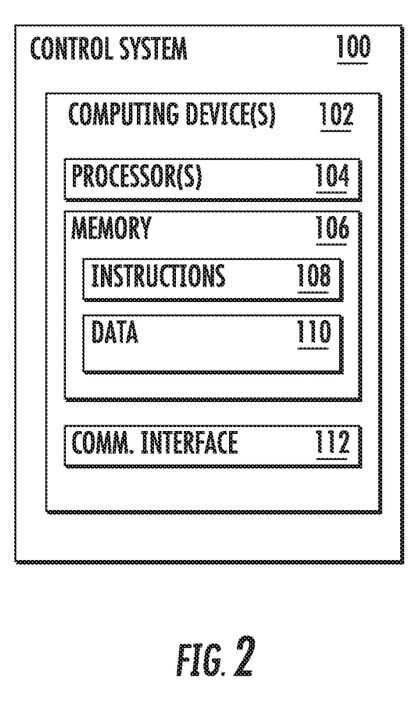
FIG. 2 is a block diagram of a computing system in accordance with an exemplary embodiment of the present disclosure.

Referring now to FIG. 2, a block diagram of an example computing system is depicted that can be incorporated into the exemplary controller 82 of FIG. 1, and further may be configured to implement the control systems described below with reference to FIGS. 3 through 6, or other systems of a gas turbine engine according to other exemplary embodiments of the present disclosure. As shown, the exemplary control system 100 includes one or more computing device(s) 102. The one or more computing device(s) 102 include one or more processor(s) 104 and one or more memory device(s) 106. The one or more processor(s) 104 may include any suitable processing device, such as a microprocessor, microcontroller, integrated circuit, logic device, or other suitable processing device. The one or more memory device(s) 106 may include one or more computer-readable media, including, but not limited to, non-transitory computer-readable media, RAM, ROM, hard drives, flash drives, or other memory devices.

The one or more memory device(s) 106 can store information accessible by the one or more processor(s) 104, including computer-readable instructions 108 that can be executed by the one or more processor(s) 104. The instructions 108 can be any set of instructions that when executed by the one or more processor(s) 104, cause the one or more processor(s) 104 to perform operations. The instructions 108 can be software written in any suitable programming language or can be implemented in hardware. In some embodiments, the instructions 108 can be executed by the one or more processor(s) 104 to cause the one or more processor(s) 104 to perform operations, such as the operations described herein.

The memory device(s) 106 can further store data 110 that can be accessed by the processors 104. For example, the data 110 can include operational schedules, operational thresholds, operational limits, etc. Further, the data 110 can include one or more table(s), function(s), algorithm(s), model(s), equation(s), etc. for determining events of the gas turbine engine as described below.

The one or more computing device(s) 102 can also include a communication interface 112 used to communicate, for example, with the other components of system. The communication interface 112 can include components for communicating with a user, such as an output device for outputting display, audio, and/or tactile information to the user. The communication interface 112 can include any suitable components for interfacing with one or more network(s), including for example, transmitters, receivers, ports, controllers, antennas, or other suitable components.

Figure 3:
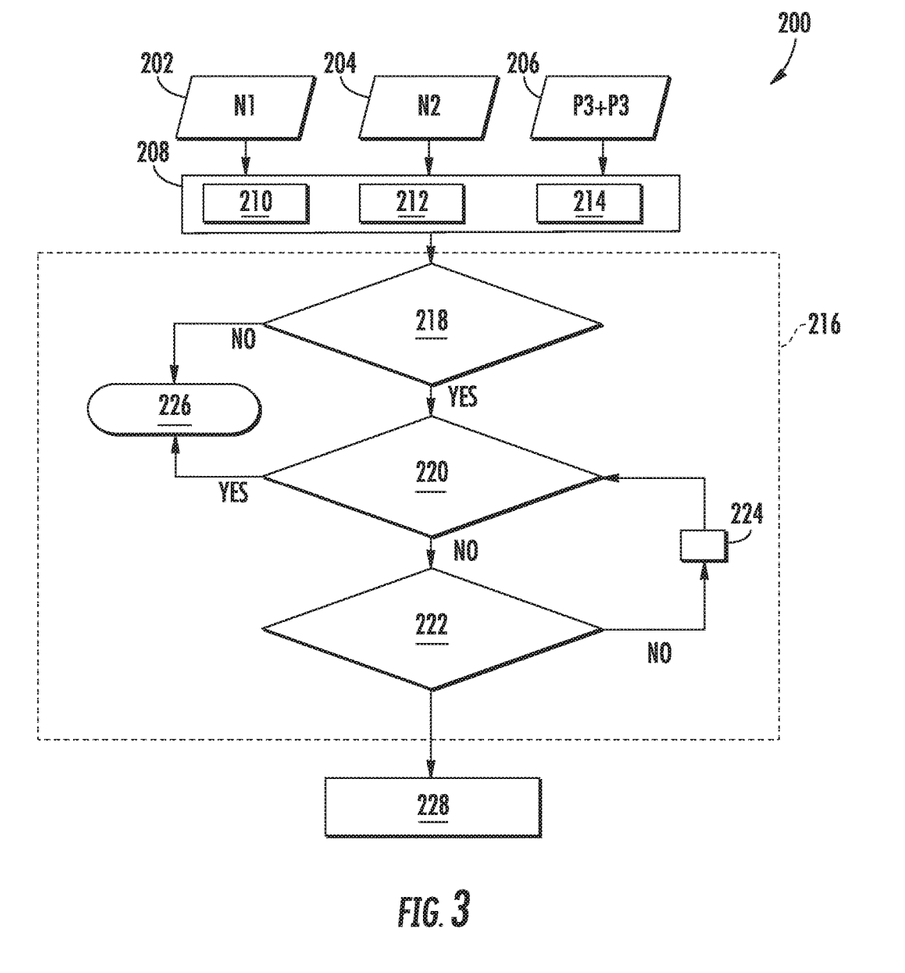
FIG. 3 is a flow diagram of a control scheme in accordance with an exemplary aspect of the present disclosure for shutting down a gas turbine engine in response to severe mechanical failure.

Referring now to FIG. 3, a control scheme 200 is depicted implementable by a controller of a gas turbine engine according to example embodiments of the present disclosure. In at least certain exemplary embodiments, the exemplary control scheme 200 of FIG. 3 may be implemented in the controller of the turbofan engine 10 described above with reference to FIG. 1. However, in other embodiments, the exemplary control scheme 200 of FIG. 3 may additionally or alternatively be implemented by a controller of any other suitable gas turbine engine (such as, for example, a turboshaft engine, a turbojet engine, a turboprop engine, an aeroderivative gas turbine engine, etc.), or alternatively still, by any other suitable controller, such as a controller of an aircraft or other vehicle with which the gas turbine engine is installed.

Although not depicted, the control scheme 200 may generally receive information regarding a first process condition, a second process condition and a third process condition. For example, the control scheme 200 may receive information from one or more sensors 80 for determining the process conditions. Specifically, for the embodiment depicted, the first process condition is a low pressure spool rotational speed ("LP spool speed N1"), the second process condition is a high pressure spool rotational speed ("HP spool speed N2"), and the third process condition is a compressor discharge pressure P3. Notably, the first, second, and third process conditions may each be corrected process conditions, i.e., process conditions corrected to a standard temperature and pressure, such as a standard day temperature at sea level.

From this information, a rate of change $\dot{N}1$ of the LP spool speed N1 is determined at 202, a rate of change $\dot{N}2$ of the HP spool speed N2 is determined at 204, and a rate of change $\dot{P}3$ of the compressor discharge pressure P3 is determined at 206. At 208, one or more the rates of change $\dot{N}1$, $\dot{N}2$, and $\dot{P}3$ of the LP spool speed N1, the HP spool speed N2, and the compressor discharge pressure P3 are reviewed to determine a potential severe mechanical failure of the gas turbine engine. The one or more the rates of change $\dot{N}1$, $\dot{N}2$, and $\dot{P}3$ may each be corrected to standard temperatures and pressures.

The rates of change $\dot{N}1$, $\dot{N}2$, and $\dot{P}3$ of the LP spool speed N1, HP spool speed N2, and compressor discharge pressure P3 may be determined based on a relatively short timeframe. In certain exemplary embodiments, these rates of change may be based on a timeframe of less than 100 milliseconds ("ms"), such as less than about 75 ms. However, the rates of change may also be based on more than two consecutive data points. For example, in certain exemplary aspects, the rate of change may be based on at least three data points, at least four data points, or any other suitable number data points. Such may ensure that any noise in the communications network, including the sensors 80, does not trigger a false positive. Additionally, in certain embodiments, the severe mechanical failure of the gas turbine engine may be a fan blade out event. However, in other embodiments, the severe mechanical event may be a shaft sheer event, such as a shearing of an LP shaft or a shearing of an HP shaft.

Determining at 208 a potential severe mechanical failure of the gas turbine engine includes, for the aspect depicted, determining at least one of the rate of change $\dot{N}1$ of the LP spool speed N1 exceeds a first failure threshold at 210, determining the rate of change $\dot{N}2$ of the HP spool speed N2 exceeds a second failure threshold at 212, or determining both the rate of change $\dot{P}3$ of the compressor discharge pressure exceeds a third failure threshold and a present value of the compressor discharge pressure P3 is below a minimum pressure threshold at 214. Each of the first failure threshold, second failure threshold, and third failure threshold are indicative of a severe mechanical failure of the gas turbine engine. Additionally, the minimum pressure threshold may be a sub-idle pressure to ensure the rate of change $\dot{P}3$ of the compressor discharge pressure exceeding the third failure threshold was not a result of a compressor stall without accompanying mechanical damage.

Figure 4:
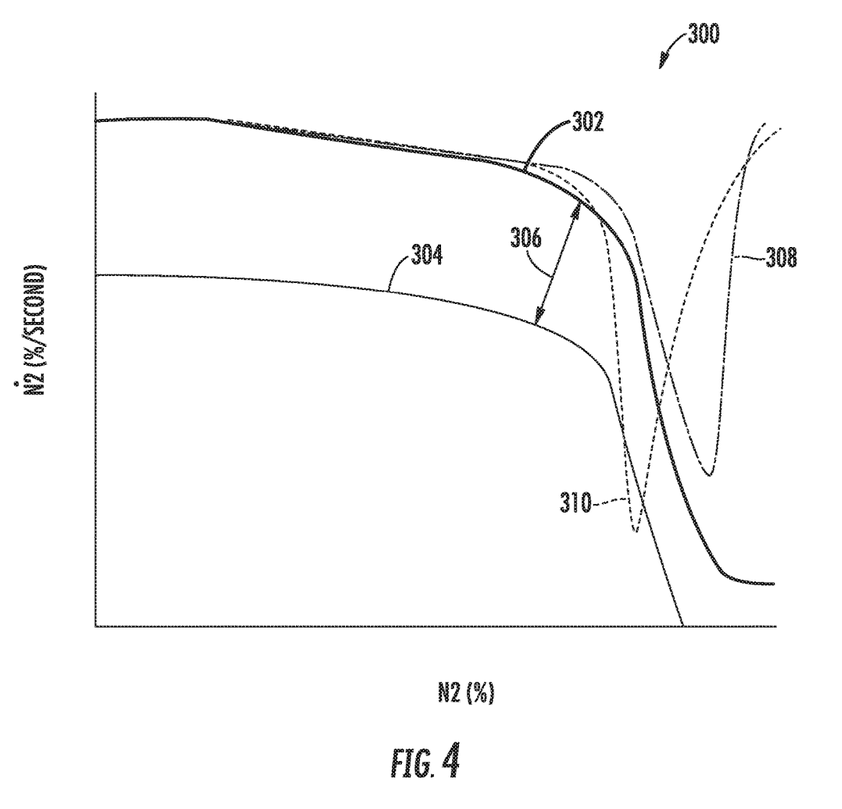
FIG. 4 is a chart depicting a predetermined failure threshold.

For example, referring briefly to FIG. 4, a chart 300 is provided depicting the second failure threshold. More specifically, the chart depicts a rate of change $\dot{N}2$ of the HP spool speed N2 on the Y-axis (in %/second) and a range of HP spool speed N2 (in percentage of a maximum HP spool speed N2) on the X-axis. The chart 300 depicts a reference line 302, which indicates the quickest slowdown of an exemplary gas turbine engine during operating conditions outside of a severe mechanical failure. Notably, the chart 300 may be specific to a particular gas turbine engine. The reference line 302 may be determined through, e.g. testing of the particular gas turbine engine, modeling for the particular gas turbine engine, etc. The chart 300 additionally includes the second failure threshold 304. For the embodiment depicted, the second failure threshold 304 is separated from the reference line 302 by a margin 306. The margin 306 may be a fixed margin (e.g., a 20% difference from the reference line 302), or may be a variable margin determined in any other suitable manner. The margin 306 may reduce a chance of determining a false positive.

Moreover, for exemplary purposes, the chart 300 depicts via exemplary line 308 a sample fast shutdown of the gas turbine engine, outside of a severe mechanical failure. As shown, the exemplary line 308 does not exceed the reference line 302, and therefore necessarily does not exceed the second failure threshold 304. By contrast, the chart 300 additionally depicts via exemplary line 310 a sample shutdown profile during a fan blade out event. As shown, during the fan blade out event, the rate of change of the second process condition exceeds the second failure threshold.

Although not depicted, the first failure threshold and third failure threshold may each define charts similar to the exemplary chart 300 depicted in FIG. 4 for the second failure threshold.

It should be appreciated, however, that although for the embodiment depicted the control scheme 200 utilizes the rates of change $\dot{N}1$, $\dot{N}2$, and $\dot{P}3$ of the LP spool speed N1, HP spool speed N2, and compressor discharge pressure P3 to determine the potential severe mechanical failure at 208, in other embodiments, the control scheme may additionally or alternatively use one or more other process conditions. For example, in certain embodiments, the control scheme may additionally or alternatively determine a vibration of one or more components of the gas turbine engine (i.e., "component vibration"). Such may be determined through one or more sensors 80 of the gas turbine engine. For example, the control scheme may determine a vibration of the LP shaft, of the HP shaft, of the fan, etc. Such a control scheme 200 may determine a potential severe mechanical failure at least in part based on the determined component vibration exceeding a predetermined threshold. For example, the control scheme 200 may determine a potential severe mechanical failure of the gas turbine engine based on the determined component vibration exceeding a predetermined threshold, in addition to one or more of step 210, step 212, or step 214 additionally indicating a potential severe mechanical failure of the gas turbine engine.

Referring now back to the exemplary control scheme 200 depicted in FIG. 3, after determining a potential severe mechanical failure at 208, the control scheme includes confirming the potential severe mechanical failure at 216. For the exemplary control scheme 200 depicted, confirming the potential severe mechanical failure at 216 includes at 218 determining whether or not at least two of the three process conditions sensed indicate a potential severe mechanical failure. Specifically, the exemplary control scheme 200 includes at 218 determining whether or not at least two of step 210, step 212, and step 214 indicate a potential severe mechanical failure of the gas turbine engine. Notably, although for the exemplary aspect depicted in FIG. 3, this confirmation step is separate from the initial step of determining a potential severe mechanical failure at 208, in other exemplary aspects, this aspect of the confirmation step may be incorporated within the initial determination of a potential severe mechanical failure of the gas turbine engine (see FIG. 6, discussed below).

In addition, for the embodiment depicted, confirming the potential severe mechanical failure at 216 includes at 220 determining whether or not a predetermined accommodation time period following the determined potential severe mechanical failure (at 208) has elapsed and, if it has not, determining at 222 if the engine is operating below idle conditions (i.e., sub-idle conditions as may be determined, e.g., by one or more of the spool speeds) and within a susceptibility window. In certain embodiments, such as the embodiment depicted, the susceptibility window may refer to the gas turbine engine operating below a predetermined fire threat flight altitude. More specifically, confirming the potential severe mechanical failure at 216 includes at 220 and 222 ensuring the engine reaches sub-idle conditions within the accommodation time period, indicating that there in fact was a severe mechanical damage causing the engine to reach sub-idle conditions in a short period of time (i.e., more quickly than during a normal shutdown procedure), and further ensuring that the gas turbine engine is below an altitude threshold above which a threat of fire is no longer an issue (e.g., due to a lack of oxygen at such an altitude). In certain exemplary aspects, the accommodation time period may be, for example, twenty (20) seconds or less, such as ten (10) seconds or less.

Notably, if it is determined at 222 that the engine is not in sub-idle conditions, or that the gas turbine engine is operating above the predetermined fire threat flight altitude, the control scheme includes at 224 waiting for an amount of time allowed by the accommodation time period at 220 to see if such conditions are met. Further, as is also shown in FIG. 3, if it is determined that the accommodation time period has elapsed at 220, or that only one of the determinations made at step 210, step 212, and step 214 indicate a potential severe mechanical failure of the gas turbine engine, the control scheme 200 includes at 226 taking no further action.

Moreover, the exemplary control scheme 200 depicted in FIG. 3 includes at 228 preventing an engine restart after the potential severe mechanical failure determined at 208 is confirmed at 216. In certain embodiments, preventing the engine restart at 228 may include one or more of closing one or more fuel metering valves of a fuel system of the gas turbine engine, closing a main fuel shutoff valve (such as a fuel high pressure shutoff valve), and disabling an ignition system of the gas turbine engine.

A control scheme 200 in accordance with the exemplary aspect described herein may allow for determining a severe mechanical failure of the gas turbine engine with relatively high confidence (e.g., in light of the confirmation steps 216), and in response shutting down the gas turbine engine to quickly reduce a risk of fire damage resulting from the engine trying to relight during such an event. Although not depicted, the exemplary control scheme 200 may additionally include a manual override feature, such that the prevention of an engine restart may be reversed or prevented by, e.g., a pilot or operator of an aircraft incorporating the gas turbine engine having the exemplary control scheme 200, in the unlikely event that a false positive is detected.

It should be appreciated, that the exemplary control scheme 200 depicted in FIG. 3 is provided by way of example only. In other exemplary embodiments, the control scheme 200 may have any other suitable configuration. For example, although for the embodiment depicted, the determination made at 218 is in series with the determinations made at 220 and 222, in other embodiments, the determination made at 218 may be in parallel with the determinations made at 220 and 222. Additionally, in other embodiments, at least certain of the determinations made at 222 may be separated out into separate parallel or series determinations.

Figure 5:
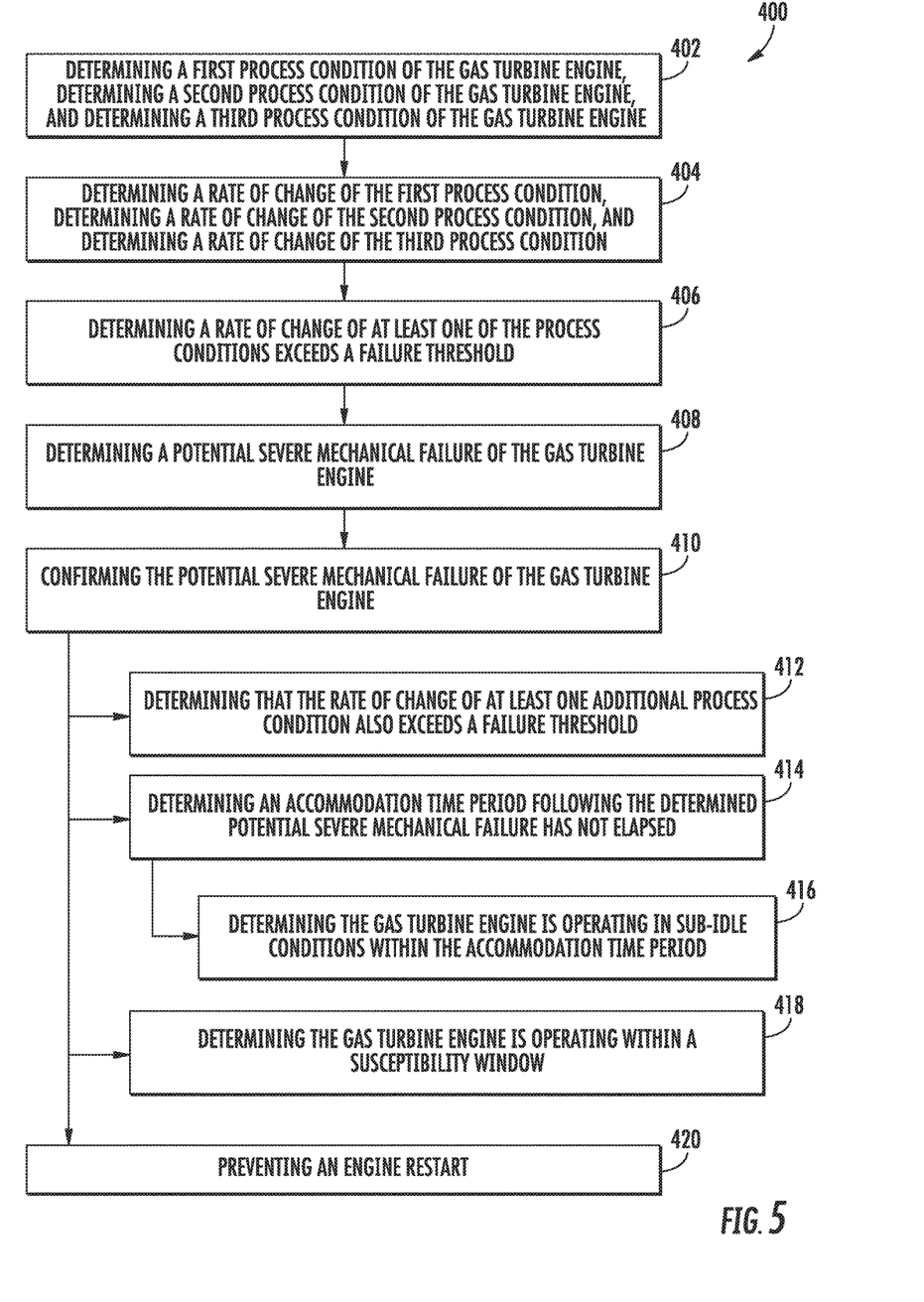
FIG. 5 is a flow diagram of a method in accordance with an exemplary aspect of the present disclosure for shutting down a gas turbine engine response to a severe mechanical failure.

Referring now to FIG. 5, a flow diagram is provided of an exemplary method (400) for shutting down the gas turbine engine in response to a severe mechanical failure. The exemplary method (400) includes at (402) determining a first process condition of the gas turbine engine, determining a second process condition of the gas turbine engine, and determining a third process condition of the gas turbine engine. In certain exemplary aspects, determining the process conditions at (402) may include determining corrected process conditions, i.e., process conditions corrected for, e.g., temperature and pressure. Additionally, in certain exemplary aspects, the first process condition may be a low pressure spool speed, the second process condition may be a high pressure spool speed, and the third process condition may be a compressor pressure, such as a compressor discharge pressure.

Additionally, the exemplary method (400) includes at (404) determining a rate of change of the first process condition, determining a rate of change of the second process condition, and determining a rate of change of the third process condition. Again, the rates of change of the process conditions may be corrected for, e.g., temperature and pressure. Further, the exemplary method (400) includes at (406) determining a rate of change of at least one of the process conditions exceeds a respective failure threshold, each failure threshold indicative of a severe mechanical failure of the gas turbine engine. In response, the exemplary method (400) includes at (408) determining a potential severe mechanical failure of the gas turbine engine based at least in part on the determined rate of change of the at least one process condition exceeding a respective failure threshold.

For example, in certain exemplary aspects, the exemplary method (400) includes at (406) determining the rate of change of the first process condition exceeds a first failure threshold, and at (408) determining a potential severe mechanical failure of the gas turbine engine based at least in part on the determined rate of change of the first process condition exceeding the first failure threshold. Notably, the severe mechanical failure of the gas turbine engine may be a fan blade out event, a shaft sheer event, or any other severe mechanical failure of the gas turbine engine.

It should be appreciated, however, that in other aspects, at least one of the process conditions may be a component vibration (e.g., a vibration of an LP shaft, HP shaft, fan, etc.). With such an exemplary aspect, the exemplary method (400) may not include determining a rate of change of each of the process conditions at (404) or determining the potential severe mechanical failure at (408) based on the rate of change of the process condition exceeding the respective failure threshold. Instead, for example, the method (400) may include determining the component vibration exceeds a failure threshold, and determining the potential severe mechanical failure may be based on the determined component vibration exceeding the failure threshold.

Having determined the potential severe mechanical failure, the exemplary method (400) includes at (410) confirming the potential severe mechanical failure of the gas turbine engine. For the exemplary aspect depicted, confirming the potential severe mechanical failure at (410) includes at (412) determining that the rate of change of at least one additional process condition also exceeds a failure threshold. For example, when the exemplary method (400) includes at (406) determining the rate of change of the first process condition exceeds the first failure threshold, confirming the potential severe mechanical failure at (410) includes at (412) determining at least one of the rate of change of the second process condition exceeds a second failure threshold or the rate of change of the third process condition exceeds a third failure threshold. In certain exemplary aspects, the third process condition is a compressor pressure. For such an exemplary aspect, determining the rate of change of the third process condition exceeds the third failure threshold additionally includes determining a present value of the compressor pressure remains below a determined value. Such may ensure that a false positive is not triggered by, e.g., a compressor stall.

Moreover, for the exemplary aspect depicted, confirming the potential severe mechanical failure of the gas turbine engine at (410) includes at (414) determining an accommodation time period following the determined potential severe mechanical failure has not elapsed. More particularly, determining the accommodation time period has not elapsed at (414) includes determining at (416) the gas turbine engine is operating in sub-idle conditions within the accommodation time period. Such a confirmation may ensure the severe mechanical failure has actually occurred, as in the event of a severe mechanical failure the gas turbine engine will be operating in sub-idle conditions within a relatively short period of time. Additionally, waiting until the engine is operating in sub-idle conditions may assist with preventing a greater than necessary change in thrust output, as engines do not produce much thrust sub-idle. In certain exemplary aspects, the accommodation time period may be, for example, twenty (20) seconds or less, such as ten (10) seconds or less.

Further, for the exemplary embodiment depicted, confirming the potential severe mechanical failure of the gas turbine engine at (410) includes at (418) determining the gas turbine engine is operating within a susceptibility window. In certain exemplary aspects, determining the gas turbine engine is operating within the susceptibility window may include determining the gas turbine engine is operating below a predetermined fire threat flight altitude. For example, when the gas turbine engine is operating above such predetermined fire threat flight altitude, the air may be sufficiently thin to ensure a threat of fire is not a concern.

Referring still to the exemplary method (400) depicted in FIG. 5, the method (400) additionally includes at (420) preventing an engine restart. Preventing an engine restart at (420) includes, for the aspect depicted, at least one of closing one or more fuel metering valves of a fuel system of the gas turbine engine, closing a main fuel shutoff valve (such as a fuel high pressure shutoff valve), or disabling an ignition system of the gas turbine engine. Such may ensure the gas turbine engine does not attempt to relight in the event of a severe mechanical failure, which may otherwise result in a potential fire hazard.

Figure 6:
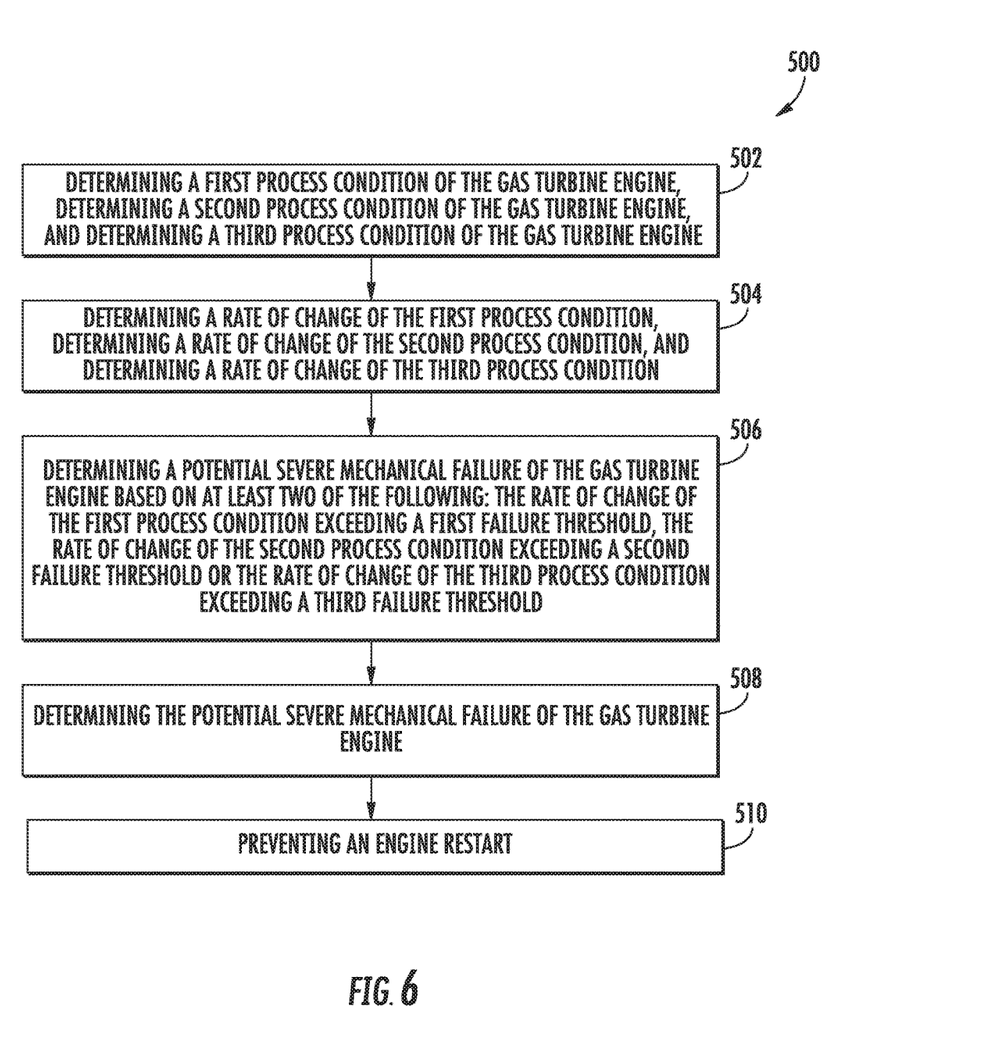
FIG. 6 is a flow diagram of a method in accordance with another exemplary aspect of the present disclosure for shutting down a gas turbine engine in response to a severe mechanical failure.

Referring now to FIG. 6, a flow diagram is provided of an exemplary method (500) for shutting down a gas turbine engine in response to a severe mechanical failure. The exemplary method (500) may operate in substantially the same manner as exemplary method (400) described above with reference to FIG. 5. For example, the exemplary method (500) includes at (502) determining a first process condition of the gas turbine engine, determining a second process condition of the gas turbine engine, and determining at third process condition of the gas turbine engine. Additionally, the exemplary method (500) includes at (504) determining a rate of change of the first process condition, determining a rate of change of the second process condition, and determining a rate of change of the third process condition.

However, the exemplary method (500) essentially incorporates one of the confirmation steps of the exemplary method (400) as a precondition for determining a potential severe mechanical failure of the gas turbine engine. Specifically, the exemplary method (500) includes at (506) determining a potential severe mechanical failure of the gas turbine engine based on at least two of the following: the rate of change of the first process condition exceeding a first failure threshold; the rate of change of the second process condition exceeding a second failure threshold; or the third process condition, or the rate of change of the third process condition, exceeding a third failure threshold. Notably, when the potential severe mechanical failure is determined at least in part based on the rate of change of the third process condition (and wherein the third process condition is a compressor pressure), the method (500) may additionally include at (506) determining a present value of the compressor pressure is below a certain threshold is a precondition for determining the potential severe mechanical failure. Additionally, when the potential severe mechanical failure is determined at least in part based on the third process condition, the third process condition may be a component vibration.

After determining the potential severe mechanical failure at (506), the exemplary method (500) may operate in a similar manner as exemplary method (400). For example, as is depicted, the exemplary method (500) includes at (508) confirming the potential severe mechanical failure of the gas turbine engine and at (510) preventing an engine restart. In certain exemplary aspects, confirming the potential severe mechanical failure of the gas turbine engine at (508) may operate in a similar manner as (410) described above with reference to FIG. 5, and more particularly, as (414), (416), and (418). Additionally, preventing the engine restart at (510) may operate in a similar manner as (420) described above with reference to FIG. 5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing a gas turbine engine restart in response to a severe mechanical failure, the method comprising:
    determining a first process condition, or a rate of change of the first process condition, exceeds a first failure threshold, the first failure threshold indicative of a severe mechanical failure of the gas turbine engine;
    determining a potential severe mechanical failure of the gas turbine engine based at least in part on the determined process condition, or the determined rate of change of the first process condition, exceeding the first failure threshold;
    confirming the potential severe mechanical failure of the gas turbine engine by determining both an accommodation time period following the determined potential severe mechanical failure has not elapsed and determining the gas turbine engine is operating in sub-idle conditions within the accommodation time period, wherein determining the gas turbine engine is operating in sub-idle conditions within the accommodation time period comprises determining the gas turbine engine has reached sub-idle conditions within the accommodation time period; and
    preventing an engine restart based at least in part on determining the gas turbine engine is operating in sub-idle conditions.

2. The method of claim 1, wherein confirming the potential severe mechanical failure of the gas turbine engine further comprises determining the gas turbine engine is operating within a susceptibility window.

3. The method of claim 2, wherein determining the gas turbine engine is operating within the susceptibility window comprises determining the gas turbine engine is operating below a predetermined fire threat flight altitude.

4. The method of claim 1, wherein the first process condition is chosen from a group comprising: a low pressure spool speed, a high pressure spool speed, a compressor discharge pressure, and a component vibration.

5. The method of claim 1, wherein determining the first process condition, or the rate of change of the first process condition, exceeds the first failure threshold comprises determining the rate of change of the first process condition exceeds the first failure threshold, and wherein the first process condition is chosen from a group comprising: a low pressure spool speed, a high pressure spool speed, and a compressor discharge pressure.

6. The method of claim 1, further comprising:
    determining a second process condition and a third process condition;
    determining a rate of change of the second process condition and a rate of change of the third process condition, wherein confirming the potential severe mechanical failure comprises determining that at least one of the rate of change of the second process condition exceeds a second failure threshold or the rate of change of the third process condition exceeds a third failure threshold.

7. The method of claim 6, wherein the first process condition, the second process condition, and the third process condition are chosen from the group comprising: a low pressure spool speed, a high pressure spool speed, and a compressor discharge pressure.

8. The method of claim 6, wherein the third process condition is a compressor pressure, wherein determining the rate of change of the compressor pressure exceeds the third failure threshold further comprises determining a present value of the compressor pressure remains below a determined value.

9. The method of claim 1, wherein preventing the engine restart comprises at least one of closing one or more fuel metering valves of a fuel system of the gas turbine engine or disabling an ignition system.

10. The method of claim 1, wherein the severe mechanical failure is at least one of a fan blade out event or a shaft sheer event.

11. The method of claim 1, wherein preventing the engine restart comprises preventing the engine restart in response to determining the potential severe mechanical failure of the gas turbine engine and confirming the potential severe mechanical failure of the gas turbine engine.

12. A method for preventing a gas turbine engine restart in response to a severe mechanical failure, the method comprising:
  determining a rate of change of a first process condition, a rate of change of a second process condition, and a third process condition;
  determining a potential severe mechanical failure of the gas turbine engine based on at least two of the following: the rate of change of the first process condition exceeding a first failure threshold, the rate of change of the second process condition exceeding a second failure threshold, or the third process condition, or a rate of change of the third process condition, exceeding a third failure threshold;
  confirming the potential severe mechanical failure of the gas turbine engine, wherein confirming the potential severe mechanical failure of the gas turbine engine comprises determining both an accommodation time period following the determined potential severe mechanical failure has not elapsed and determining the gas turbine engine is operating in sub-idle conditions within the accommodation time period, wherein determining the gas turbine engine is operating in sub-idle conditions within the accommodation time period comprises determining the gas turbine engine has reached sub-idle conditions within the accommodation time period; and
  preventing an engine restart based at least in part on determining the gas turbine engine is operating in sub-idle conditions.

13. The method of claim 12, wherein determining the potential severe mechanical failure of the gas turbine engine is based at least in part on the rate of change of the third process condition, wherein the third process condition is a compressor pressure, and wherein determining the potential severe mechanical failure of the gas turbine engine is further based on determining a present compressor pressure remains below a determined pressure.

14. The method of claim 12, wherein determining the potential severe mechanical failure of the gas turbine engine is based at least in part on the third process condition, wherein the third process condition is a component vibration.

15. The method of claim 12, wherein the first process condition is a low pressure spool speed, wherein the second process condition is a high pressure spool speed, and wherein the third process condition is a compressor discharge pressure.

16. A control system for preventing a gas turbine engine restart in response to a severe mechanical failure, the system comprising one or more processors and one or more memory devices included with the gas turbine engine, the one or more memory devices storing instructions that when executed by the one or more processors cause the one or more processors to perform operations, the operations comprising:
  determining a rate of change of a first process condition exceeds a first failure threshold, the first failure threshold indicative of a severe mechanical failure of the gas turbine engine;
  determining a potential severe mechanical failure of the gas turbine engine based at least in part on the determined rate of change of the first process condition exceeding the first failure threshold;
  confirming the potential severe mechanical failure of the gas turbine engine by determining both an accommodation time period following the determined potential severe mechanical failure has not elapsed and determining the gas turbine engine is operating in sub-idle conditions within the accommodation time period, wherein determining the gas turbine engine is operating in sub-idle conditions within the accommodation time period comprises determining the gas turbine engine has reached sub-idle conditions within the accommodation time period; and
  preventing an engine restart based at least in part on determining the gas turbine engine is operating in sub-idle conditions.

17. The control system of claim 16, wherein confirming the potential severe mechanical failure of the gas turbine engine further comprises determining the gas turbine engine is operating below a predetermined fire threat flight altitude.

\* \* \* \* \*